United States Patent
Szucs et al.

(10) Patent No.: US 7,370,236 B2
(45) Date of Patent: May 6, 2008

(54) METHOD FOR REMOTELY DIAGNOSING DEVICES

(75) Inventors: Paul Szucs, Ostfildern (DE); Ulrich Clanget, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 311 days.

(21) Appl. No.: 10/303,984

(22) Filed: Nov. 25, 2002

(65) Prior Publication Data
US 2003/0140279 A1    Jul. 24, 2003

(30) Foreign Application Priority Data
Nov. 28, 2001   (EP)   ................... 01128244

(51) Int. Cl.
*G06F 11/00* (2006.01)
(52) U.S. Cl. ................... 714/25; 714/4; 714/38
(58) Field of Classification Search ........... 714/4, 714/38, 25; 709/223, 224
See application file for complete search history.

(56) References Cited

U.S. PATENT DOCUMENTS

| | | | | |
|---|---|---|---|---|
| 6,145,096 A * | 11/2000 | Bereiter et al. | ................ | 714/25 |
| 6,611,867 B1 * | 8/2003 | Bowman-Amuah | ......... | 709/224 |
| 6,681,344 B1 * | 1/2004 | Andrew | ................ | 714/38 |
| 6,684,204 B1 * | 1/2004 | Lal | ................ | 707/3 |
| 6,842,433 B2 * | 1/2005 | West et al. | ................ | 370/312 |
| 6,857,013 B2 * | 2/2005 | Ramberg et al. | ............ | 709/223 |
| 6,901,403 B1 * | 5/2005 | Bata et al. | ................ | 707/101 |
| 7,133,906 B2 * | 11/2006 | Price et al. | ................ | 709/220 |
| 7,200,651 B1 * | 4/2007 | Niemi | ................ | 709/223 |

FOREIGN PATENT DOCUMENTS

| WO | WO 99 57838 | 11/1999 |
|---|---|---|
| WO | WO 00 45265 | 8/2000 |

OTHER PUBLICATIONS

D. Cox: "XML for Instrument Control and Monitoring" Dr. Dobb's Journal, vol. 26, No. 11, Nov. 2001, pp. 83-85, XP008003564.
"Teleservice Systems for Lab Analysis—Luca in Action" Langner—Tools and Solutions for Automated Data Flow, Online! Oct. 12, 2001, pp. 1-2, XP002200155.
"Extensible Markup Language (XML) 1.0 (Second Edition)" W3C Recommendation, Online!, Oct. 6, 2000, pp. 1-59, XP002200156.
D. Box et al.: "Simple Object Access Protocol (SOAP) 1.1" W3C Note, Online! May 8, 2000, pp. 1-26, XP002200157.

* cited by examiner

*Primary Examiner*—Emerson Puente
(74) *Attorney, Agent, or Firm*—Oblon, Spivak, McClelland, Maier & Neustadt, P.C.

(57) ABSTRACT

A method for diagnosing devices via a remote testing device (1) which is connectable to devices ($3_1$ to $3_4$) to be diagnosed via a communication network (2) is proposed, wherein said diagnosing is performed by exchanging diagnostics information between said remote-testing device (1) and said devices ($3_1$ to $3_4$) to be tested via said communication network (2). Said process of exchanging diagnostics information is at least partially done by using a communication protocol being based on XML-scripts which include said diagnostics information. The advantage of this method is a lean and platform-independent way of diagnosing devices, which enables to avoid unnecessary efforts and costs.

16 Claims, 6 Drawing Sheets

METHOD FOR REMOTELY DIAGNOSING DEVICES

The invention relates to a method, a remote testing device, a device and a system for remotely diagnosing devices.

It is known to diagnose devices from remote. Remote diagnostics makes it for example possible for users of home network devices to get immediate help from a service company if the users have problems to use said devices: The service company may for example diagnose the internal state of a home network device from remote, thus determining the kind of problem to be solved. Often it is even possible to "repair" home network devices from remote (for example by a parameter setting process), thus enabling the service company to save a lot of effort and costs.

Different users of home networks, however, may deploy different network technologies which may be wired and wireless network technologies. Therefore, it is often difficult for the service companies to diagnose said devices, since it is not always clear which specific network technology (for example which communication protocol) has to be used in order to deal with a specific home network device to be diagnosed.

As an example of a possible network technology, document WO 00/45265 discloses to use SNMP (Simple Network Management Protocol) to test devices remotely. However, SNMP is a very complicated protocol showing only low efficiency.

Bandwidth capacity is needed for information which is not important, such as the SNMP version (transmitted in every SNMP message) and multiple length and data descriptors scattered throughout each message. The way that SNMP variables are identifiers (byte strings where each byte corresponds to a particular node in the MIB data base) leads to unnecessary large data units that consume substantial parts of each SNMP message.

It is an object of the present invention to provide a method for diagnosing devices which avoids unnecessary information overheads while at the same time being capable to deal with various kinds of network technologies employed by respective devices to be diagnosed.

According to the present invention, the method for diagnosing devices uses a remote testing device which is connectable to devices to be diagnosed via a communication network. The diagnosing is performed by exchanging diagnostics information between the remote testing device and the devices to be tested via the communication network. An important aspect of the invention is that the process of exchanging diagnostics information is at least partially done by using a communication protocol being based on XML-scripts which include said diagnostics information.

The method described above provides a common, transparent mechanism for:
- obtaining information about the devices present in a user's network as well as a connection topology of said devices,
- issuing diagnostic test commands to individual devices in the user's network, and
- obtaining the associated test results.

XML (Extensible Mark-Up Language) is already in widespread use for a platform-independent communication between devices. Thus, the use of XML-scripts enables to deploy a common communication mechanism regardless of the remote tester computer platform (remote testing device), the various device-under-test-platforms, and the specific network technologies underlying XML. As a result, a service company which has to diagnose a device (for example arbitrary consumer-type equipment) from remote does not have care about technical details of respective network communication technologies which enables to very easily diagnose a broad variety of devices. Further, XML provides a lean way to communicate, thus avoiding unnecessary overheads.

Preferably, the XML-scripts employed by the present invention are defined as an extension to the XML-language, said extension enabling XML to be used for remote diagnosis by defining a mechanism for sending test commands to remotely located devices to be tested and obtaining the results of such tests. Said extension will be specified in detail later on and will be also referred to as Remote Diagnosis Mark-Up Language (RDML).

In a preferred embodiment, the XML-scripts comprise XML-tag structures which respectively contain parts of said diagnostics information. Using these tag structures, exchanging diagnose command information can be realized by using command tag structures containing diagnose command information within the XML-scripts. Accordingly, exchanging diagnose response information can be realized by using response tag structures containing diagnose response information within the XML-scripts.

In a preferred embodiment, a diagnostic protocol agreement between the remote testing device and the devices to be diagnosed is performed at the beginning of a diagnosing process. The diagnostic protocol agreement specifies which specific XML-syntax has to be used within said XML-scripts when exchanging diagnostics information in the further communication process. For example, a protocol tag structure may be used to exchange diagnostic protocol information, thereby performing the protocol agreement.

In the foregoing description, it has been assumed that the remote testing device as well as the devices to be tested/diagnosed directly support XML-based communication. However, it may be the case that a device to be diagnosed does not directly support XML, which means that this device can only be diagnosed by using a device specific diagnose protocol. In this case, XML-scripts are used to exchange the diagnostics information between the remote testing device and a gateway interfacing the remote testing device and the device to be diagnosed. A device-specific diagnose protocol is then used to exchange the diagnostics information between the gateway and the device to be tested, wherein the gateway transfers the diagnostics information from/to the XML-scripts to/from the device-specific diagnose protocol. In other words, the gateway which may be a device to be tested itself functions like a communication protocol-transferring engine. Thus, even in this case, a service company does not have care about device-specific network technologies, since a possible protocol conversion is completely executed by a respective gateway.

To perform the above-described method, it is necessary that the devices to be tested/diagnosed (also only referred to as devices) as well as the remote testing device comprise specific functionality, respectively. Therefore, the present invention provides a remote testing device being connectable to devices to be diagnosed via a communication network, said remote testing device comprising communication means for sending/receiving diagnostics information to/from the devices to be diagnosed, wherein the communication means comprise an XML-client-module having functionality to use XML-scripts as a communication protocol for sending/receiving the diagnostics information.

The XML-client-module is preferably realized as a software module installed within the remote testing device. The base layer to perform communication preferably is an Internet Protocol (IP) layer, the first layer above the Internet Protocol layer preferably is a Transport Control Protocol (TCP) layer, wherein above the Transport Control Protocol layer preferably a further socket layer is provided. The XML-client-module uses functionality of the socket layer in order to perform respective communication tasks. The remote testing device advantageously comprises embedding means for embedding the diagnostics informa-tion into the XML-scripts for sending the scripts together with respective diagnose information to the devices to be tested. Accordingly, the remote testing device may comprise extracting means for extracting diagnostics information from XML-scripts received from the devices to be diagnosed/tested.

The invention further provides a device being connectable to a remote testing device via a communication network, said device comprising communication means for sending/receiving diagnostics information to/from said remote testing device, wherein said communication means comprises an XML-server-module having functionality to use XML-scripts as a communication protocol for sending/receiving the diagnostics information. The device may be a device to be tested itself as well as a gateway interfacing a device to be tested and the remote testing device.

Preferably, the device comprises diagnosing means being connected to the communication means for executing diagnostics tasks in dependence of said diagnostics information. To enable a proper communication between the XML-server-module and the XML-client-module, the communication means of the device in an analogous manner comprises an Internet Protocol layer, a Transport Control Protocol layer being based upon said Internet Protocol layer, a socket layer being based upon said Transport Control Protocol layer, wherein the XML-server-module uses the functionality of the socket layer to perform respective diagnosis communication tasks. In addition, also said device may comprise extracting means for extracting diagnostics information from the XML-scripts and/or embedding means for embedding diagnostics information into the XML-scripts.

In a preferred embodiment, the device comprises communication protocol converting means for transferring diagnostics information from/to the XML-scripts to/from a device-specific diagnose protocol, as already indicated above. To use the device-specific diagnose protocol, a device may comprise a device-specific diagnose protocol layer usable by the XML-server-module to exchange the diagnostics information with a device to be diagnosed which is connectable with the XML-server-module via the device-specific diagnose protocol layer.

The present invention further provides a system for remotely diagnosing devices which comprises a remote testing device according to the present invention, and at least one device to be diagnosed according to the present invention, wherein the remote testing device and the at least one device to be diagnosed are respectively connected via the communication network.

Finally, the present invention provides a computer program product comprising computer program means adapted to perform the method steps according to the present invention or any step thereof when it is executed on a computer, a digital signal processor or the like.

In the following description, further features and embodiments of the present invention will be discussed while making reference to the accompanying drawings, wherein.

In the following description, a preferred embodiment of an extension to the XML-language (RDML) will be given.

Generally, this embodiment of RDML consists of two parts, namely network information retrieval and device diagnostics. The network information retrieval part enables a service center using the remote testing device to find out which devices to be tested are connected by which network technologies (for example in the user's (home) network), and the actual topology of the whole network. The device diagnostics part enables the service center to address diagnostic test commands to a particular device in the home network and retrieve the result of that test or device status. The execution and communication of diagnostic tests will be network-dependent in the home network, if an end device to be tested does not support the IP-protocol (for example SDI-based communications used for non-IP devices connected via i.Link), but the content and transfer of information between the service center and a gateway interfacing said device is common, i.e. is based on RDML. In other words, all home network devices not supporting IP communication mechanisms and therefore not supporting XML-based communications are hidden behind a gateway supporting IP/XML communication which acts as an interface between the remote testing device and the devices to be diagnosed. All other home network devices may be directly addressed by the remote testing device without using the gateway, but nevertheless it may be communicated via the gateway which in this case has a router function.

In this embodiment, all communication is done by command and response tags (blocks). The general tag structure for a command is:

```
<cmd>
    <name> command name </name>
    <parameter>
        command parameter
    </parameter>
</cmd>
```

If no parameters are passed for a particular command, then the <parameter> block will be empty, signified by the <parameter/> tag. The general tag structure for a response is:

```
<response>
    response content
</response>
```

If an error occurs while executing an RDML command set, an exception is thrown (enclosed in a response tag) and is delivered back to the command initiator (remote testing device). The general structure of an exception is:

```
<exception>
    <errorcode> code </errorcode>
    <message> text </message>
</exception>
```

The <errorcode> is an unique integer identifier for the occured error. There are some standard codes defined for common errors. Standard error codes are in range $[0 \ldots 2^{15}]$.

[Fliessendes Objekt]

Preferably, a mechanism for custom error codes is provided. Custom error code range is at $]2^{15} \ldots 2^{16}[$. The <message> tag is optional and may contain a detailed description of the error.

RDML supports an event mechanism which enables clients (for example the remote testing device) to get status changes in the home network. An event is defined as follows:

```
<event>
    <name></name>
    <content></content>
</event>
```

Before exchanging/processing any command tags, a protocol agreement must be performed. To start said protocol agreement, the client uses the following tag structure as protocol command:

```
<cmd>
    <name>protocol</name>
    <parameter>
        <version>
            <major> x </major>
            <minor> y </minor>
        <version>
    </parameter>
</cmd>
```

The <version>parameter contains the major and minor version number. For example, the major version number is 1 and the minor version number is 0.

To perform the protocol agreement, the client sends the protocol command with the highest protocol version it supports. The server (for example device to be diagnosed) reads the protocol version and sends its highest protocol version back to the client (enclosed in a response tag). The client and the server now agree on the minimum of the two delivered versions.

To get an overview of the devices in the (home) network, the RDML server supports a command to get a list of all devices. The command has the simple tag structure:

```
<cmd>
    <name>devicelist</name>
    <parameter/>
</cmd>
```

A corresponding response tag contains the list of devices, and shows the following tag structure:

```
<devicelist>
    devices
</devicelist>
``` wherein "devices" represents at least one of the following tag structures:

```
<device>
    <guid> guid </guid>
    <modelid>modelid </modelid>
    <flags> flags</flags>
</device>
``` where "guid" (global unique identifier) is a unique reference to the device in question like its serial number or the IEEE1394 GUID. "modelid" contains a string for the model class of the device, and "flags" defines properties for this device. The properties format may be a 32 bit mask, converted to a hexadecimal representation without a leading "0x". For example, only one property is defined: diagnostics support. This flag signifies whether the "standard" network-specific test/diagnostics mechanism is supported by that device. For example, for i.LINK this flag signals support of SDI. If diagnostics is supported by the device, the LSB (least significant bit) in flags should be set.

EXAMPLE

```
<device>
    <guid>0800465788632</guid>
    <modelid>MDA-LSA1</modelid>
    <flags>00000001</flags>       (LSB is set)
</device>
```

The network topology defines the structure of the home network (which devices are directly connected and which device is the root of the network). The topology for an IEEE 1394 network has the structure of a tree, but other networking technologies have different topology structure. For RDML, preferably a common representation for all networking technologies is used, in the following referred to as "graphs". In the graph topology, nodes represent devices, and each edge defines a connection between devices. In wired networking technologies, this is a cable, in wireless networks this is a virtual connection. For wired-wireless bridges, the topology reveals which device is acting as the bridge for any particular wireless device.

The command tag structure for retrieving the network topology is:

```
<cmd>
    <name>networktopology</name>
    <parameter/>
</cmd>
```

The structure of a network topology, returned in a response block with content <topology>, shows the following tag structure:

```
<topology>
    <networkstandard>standard1</networkstandard>
    <nodes>
    nodes . . .
    </nodes>
    <edges>
    edges . . .
    </edges>
    <networkstandard>standard2</networkstandard>
    <nodes>
    nodes . . .
    </nodes>
    <edges>
    edges . . .
    </edges>
    . . .
</topology>
```

The whole topology contains a collection of network standards, each of which contains a node list and an edge list.

The <networkstandard> tag may for example assign the following lists of nodes and edges to their network technology:

[Fliessendes Objekt]
Each node tag conforms to the syntax:

```
<node>
    <id> </id>
    <guid> </guid>
    <label> </label>
    <description> </description>
</node>
```

An RDML node tag contains four subtags. <id> is a unique arbitrary integer to identify each node in the edges list. The <guid> tag is used to assign each node to a unique network-standard-specific device identifier. The <label> tag preferably is a short description of the device, normally the model name. The <description> tag enhances the label description.

Each network-standard-specific connection, whether real (wired) or virtual (wireless) is documented as an edge block:

```
<edge>
    <source> </source>
    <sink> </sink>
</edge>
```

To define a connection between nodes, an edge list is supported. An edge contains a source and a destination node, called sink. While the terms "source" and "sink" imply a direction in the connection, this is not relevant to most networking technologies and may be ignored in that sense. These terms have been taken from standard network graph theory.

Figure 7:
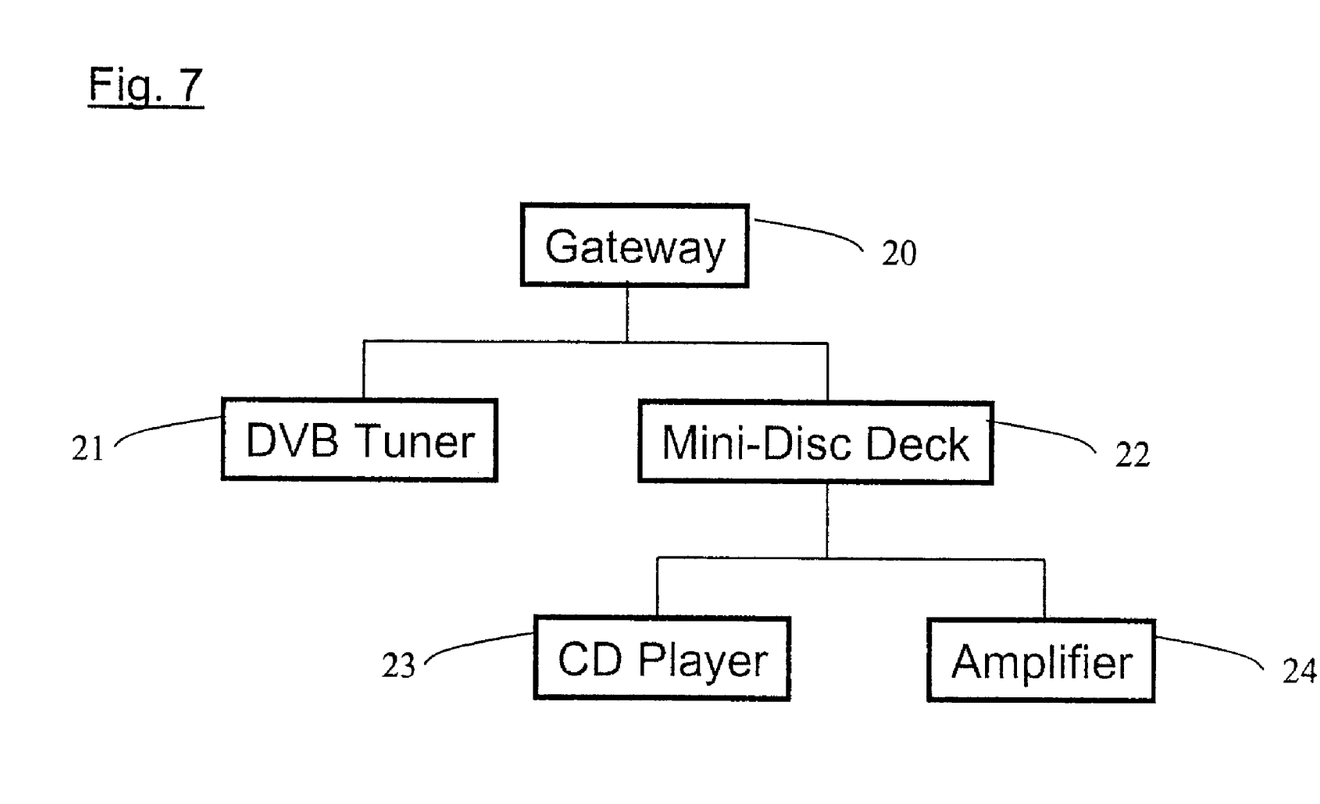
FIG. 7 shows an example of visualizing topology issues of interconnected devices according to the present invention.

An example for a network topology is shown in FIG. 7. In this topology, a gateway 20 is connected to a DVB tuner 21 and a mini disc deck 22. The mini disc deck 22 itself is connected to a CD player 23 and an amplifier 24. The topology of this example can be expressed as follows:

```
<topology>
    <networkstandard>
    IEEE1394-1995
    </networkstandard>
    <nodes>
        <node>
            <id>0</id>          <label>Gateway</label>
            <guid>0800460578632</guid>
            <description>Home Network Gateway</description>
        </node>
        <node>
            <id>1</id>
            <label>DVB-ATCS</label>
            <guid>0800460578633</guid>
            <description>Digital Satellite Receiver</description>
        </node>
        <node>
            <id>2</id>
            <label>MDS-LSA1</label>
            <guid>0800460578634</guid>
            <description>Mini Disc</description>
        </node>
        <node>
            <id>3</id>
            <label>CDP-LSA1</label>
            <guid>0800460578635</guid>
            <description>CD Player</description>
        </node>
        <node>
            <id>4</id>
            <label>STR-LSA1</label>
            <guid>0800460578636</guid>
            <description>Receiver</description>
        </node>
    </nodes>
    <edges>
        <edge>
            <source>0</source>
            <sink>1</sink>
        </edge>
        <edge>
            <source>0</source>
            <sink>2</sink>
        </edge>
        <edge>
            <source>2</source>
            <sink>3</sink>
        </edge>
        <edge>
            <source>2<source>
            <sink>4</sink>
        </edge>
    </edges>
<topology>
```

This method of representing graphs in XML can be seen as a much more simple subset of XGMML (eXtensible Graph Markup and Modeling Language).

The RDML server supports an event mechanism which enables clients to get a realtime view of the inspected home network environment. A client must register himself to get the network update events. The registration is done by the registerevent command:

```
<cmd>
    <name>registerevent</name>
    <parameter>
        <event> </event>
    </parameter>
</cmd>
```

The event to register is specified via the <event> tag. In case of the network topology update the event name is 'networktopology'.

If an error occurs during the event registration, an exception is thrown with either a common error code or one of the following error codes:

[Fliessendes Objekt]

If the network topology changes, the client receives an asynchronous event on the same connection as the command pipe. This event has the following sructure:

```
<event>
    <name>networktopology</name>
    <content/>
</event>
```

The content of the <networktopology> event is empty. The client must acquire the actual network topology with a separate call.

Performing diagnosis tests is done on the basis of sending a test command and receiving a response code and optional readable text describing the result of the test. Thus, this part of RDML gives for example a network-independent abstraction of an IEEE1394-specific test and diagnosis mechanism. A test command is bundled in the following XML structure:

```
<cmd>
    <name>diagnostictest</name>
    <parameter>
        <guid> </guid>
        <code> </code>
    </parameter>
</cmd>
``` where <guid> is the unique id for the DUT (Device Under Test) returned by the devicelist command and <code> is an integer preferably coded in hexadecimal format without a leading 0x.

The response contains a response code for example in a hexadecimal format (31 bit when dealing with IEEE1394 devices which support SDI (Service Diagnostic Interface, see for example European Patent Application No. 01 102 231.6)) and a description of the test result in a specified language:

```
<sdiresponse>
    <responsecode> </responsecode>
    <description>
        <language> </language>
        <text> </text>
    </description>
</sdiresponse>
```

If an error occurs during the test, an exception is thrown with either a common error code or one of the following error codes:

[Fliessendes Objekt]

Figure 1:
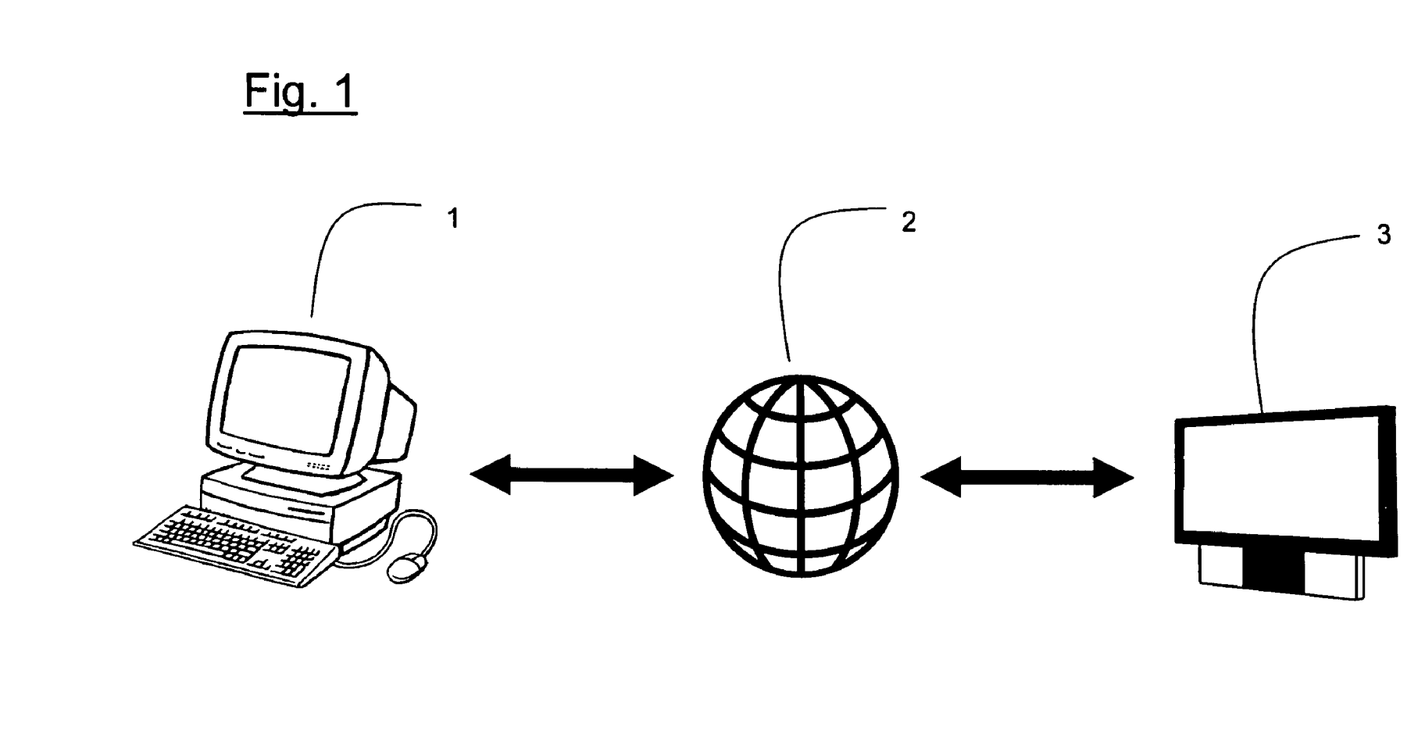
FIG. 1 shows a schematic drawing illustrating the correlation between a remote testing device and a device to be diagnosed according to the present invention.

In the following description, making reference to FIG. 1, the principle of the communication between a remote testing device and a device to be tested will be described.

A remote testing device 1, for example a computer, is linked via an IP-based network connection, for example the Internet 2, to a device to be tested/diagnosed 3 also referred to as DUT (Device Under Test). The remote testing device 1 sends diagnostics information in form of XML-scripts via the IP-based network connection 2 to the DUT 3 which processes the information, eventually performs self-diagnostic tasks and sends respective results in form of XML-scripts via the IP-based network connection 2 back to the remote testing device 1.

Figure 2:
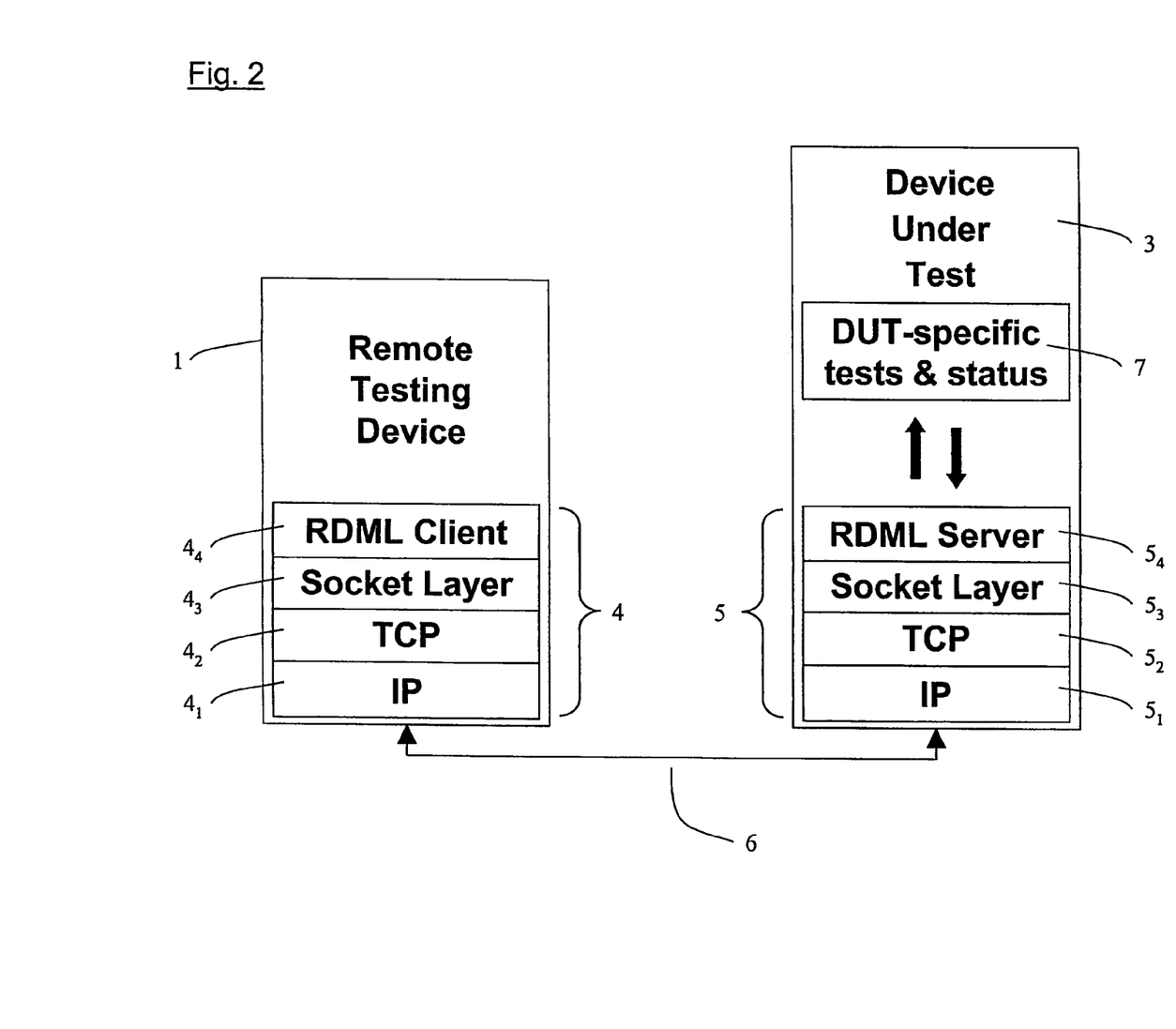
FIG. 2 shows a preferred embodiment of a protocol stack used to communicate between the remote testing device and the devices to be diagnosed according to the present invention.

Referring to FIG. 2, a preferred embodiment of a protocol stack used to communicate between the remote testing device 1 and the DUT 3 will be discussed.

A first protocol stack 4 being located within the remote testing device 1 comprises an IP-layer $4_1$, an TCP-layer $4_2$, a socket layer $4_3$, and an XML-client-module $4_4$, also referred to as RDML-client. In an analogous manner, a second protocol stack 5 being located within a DUT 3 comprises an IP-layer $5_1$, a TCP-layer $5_2$, a socket layer $5_3$, and an XML-server-module $5_4$, also referred to as RDML-server. Each layer uses functionality of the respective underlying layer to perform its tasks. The IP-layer $4_1$ of the first protocol stack 4 and the IP-layer $5_1$ of the second protocol stack 5 are interconnected via an IP-based connection 6. The first protocol stack 4 and the second protocol stack 5 are preferably realized as software modules and can be regarded as part of respective communication means.

The DUT 3 further comprises a diagnose module 7 for performing self-tests, providing device-specific information and the like. The diagnose module 7 performs respective tasks in response to a communication process with the remote testing device 1 in dependence of diagnostics information provided by the RDML-server $5_4$. Results or device-specific data are supplied to the RDML-server $5_4$ which uses above-described protocol stack layers $5_1$ to $5_3$ to transmit this information back to the remote testing device 1.

In a preferred embodiment, the RDML-server $5_4$ listens for client requests on the prescribed socket. A test process being executed by the diagnose module 7 is initiated by the RDML-client $4_4$.

In the following, two test scenarios are described. The first is to use a single DUT 3. Here, the remote testing device 1 just uses the functionality of the testing part of the RDML-server $5_4$. In the second scenario which deals with multiple DUTs 3 in a home network, the complete functionality of the RDML-server $5_4$ as described above is needed to perform the diagnostic process.

In the case of using just one single DUT 3, the remote testing device 1 uses the "devicelist" command to determine what kind of device the DUT 3 is. On account of the model ID returned by the DUT 3, the remote testing device 1 then locally retrieves information (for example from a attached product database) about which tests are implemented on this DUT 3. The remote testing device 1 then proceeds with issuing RDML-test commands to the DUT 3.

In the following, making reference to FIG. 3, a preferred sequence of establishing and performing a diagnostic session with the single DUT 3 after the point of physical connection set-up is shown. This is common to all types of access network. All transitions in the sequence diagram between the remote-testing device 1 and the DUT 3 involve the transfer of RDML-content over IP, as described above.

In a first step S1, the remote testing device 1 uses the RDML-<devicelist> command tag to request the RDML-server $5_4$ of the DUT 3 to return device list information. The RDML-server $5_4$ executes this command using the RDML-<devicelist> response tag with appropriate contents. In a second step S2, the remote testing device inquires a product data base (not shown) being connected to the remote-testing device 1 as to which tests the respective DUT 3 supports, as well as expected and possible test results and status. In a third step S3, the remote-testing device 1 initiates respective tests on the DUT 3. To do this, the RDML-client $4_4$ could be an application comprising either a manual user interface-driven software operated by test personal, or an automated software agent deriving enough intelligence from the product data base in the implemented test in order to purposefully diagnose the DUT 3 and its interconnects. Preferably, this step S3 involves many exchanges of RDML-tests, RDML-responses, and getstatus tag blocks between the remote testing device 1 and the DUT 3. In a fourth step S4 it is decided whether a problem has been to be diagnosed. If this is the case, then in a fifth step a respective solution is provided. In the ideal case, the result of the test session is that a user or a DUT problem has been solved by some parameter setting, or by a hint submitted to the user. Other possibilities are that a required spare part for a repair is ascertained, and necessary information about this case is passed to other instances for completion. In case that the problem has not been diagnosed by a specific test, another test may be initiated by the remote-testing device 1. After having finished the diagnose session illustrated by FIG. 3, in a sixth step S6 the physical connection between the remote testing device 1 and the respective DUT 3 is closed.

Figure 3:
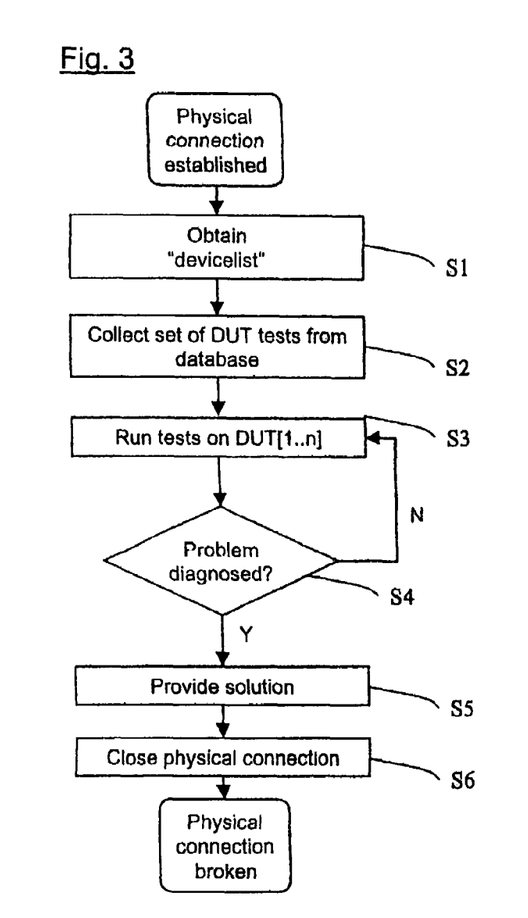
FIG. 3 shows a flow-chart illustrating respective steps performed when communicating between a remote testing device and a device to be tested according to the present invention.
Figure 4:
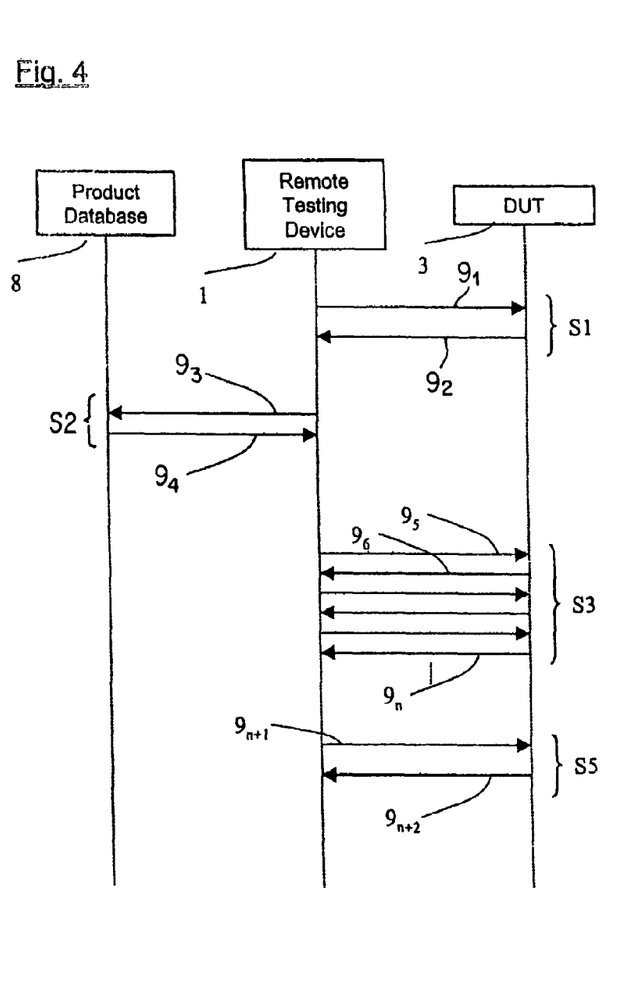
FIG. 4 shows a sequence diagram illustrating respective steps performed when communicating between a remote testing device and the devices to be tested according to the present invention.

In FIG. 4, it is illustrated between which devices communication takes place when executing the first to sixth step S1 to S6 of FIG. 3. In the first step S1, remote testing device 1 sends a first request to the DUT 3, indicated by the first arrow $9_1$. Then, the DUT 3 sends a device list back to the remote testing device 1 which is indicated by a second arrow $9_2$. In the second step, the remote testing device 1 sends a request to the product data base 8, indicated by the third arrow $9_3$. The product data base 8 sends back a corresponding set of information, indicated by the fourth arrow $9_4$. Then, in the third step S3, several requests and answers are performed between the remote testing device 1 and the DUT 3, indicated by the fifth arrow to the n-th arrow $9_5$ to $9_n$. Last, in the fifth step S5, the remote testing device 1 provides a solution to the DUT 3, indicated by the (n+1)-th arrow $9_{n+1}$. The DUT 3 communicates to the remote testing device 1, if the solution-providing process has been successfully completed, indicated by the (n+2)th arrow $9_{n+2}$.

In the following description, making reference to FIG. 5, a network test scenario is presented in which the devices to be diagnosed are home network devices being connected with partely different network technologies.

A home network 10 comprises a home gateway as a first DUT $3_1$, a TV set as a second DUT $3_2$, recording device as a third DUT $3_3$, and a camcorder as a fourth DUT $3_4$. The home gateway $3_1$ and the TV set $3_2$ are connected with each other via network1 11 (cable), the TV $3_2$ and the recording device $3_3$ are connected with each other via network2 12 (cable) and the home gateway $3_1$ and the camcorder $3_4$ via network3 13 (wireless).

The remote testing device 1 receives, when applying the RDML-"devicelist" command, the information that there are several devices present. Thus, the remote testing device 1 then uses the "network topology" command to establish the nature of the network connecting the first to fourth DUTs $3_1$ to $3_4$ with each other which could also have something to do with the problem at hand.

Figure 5:
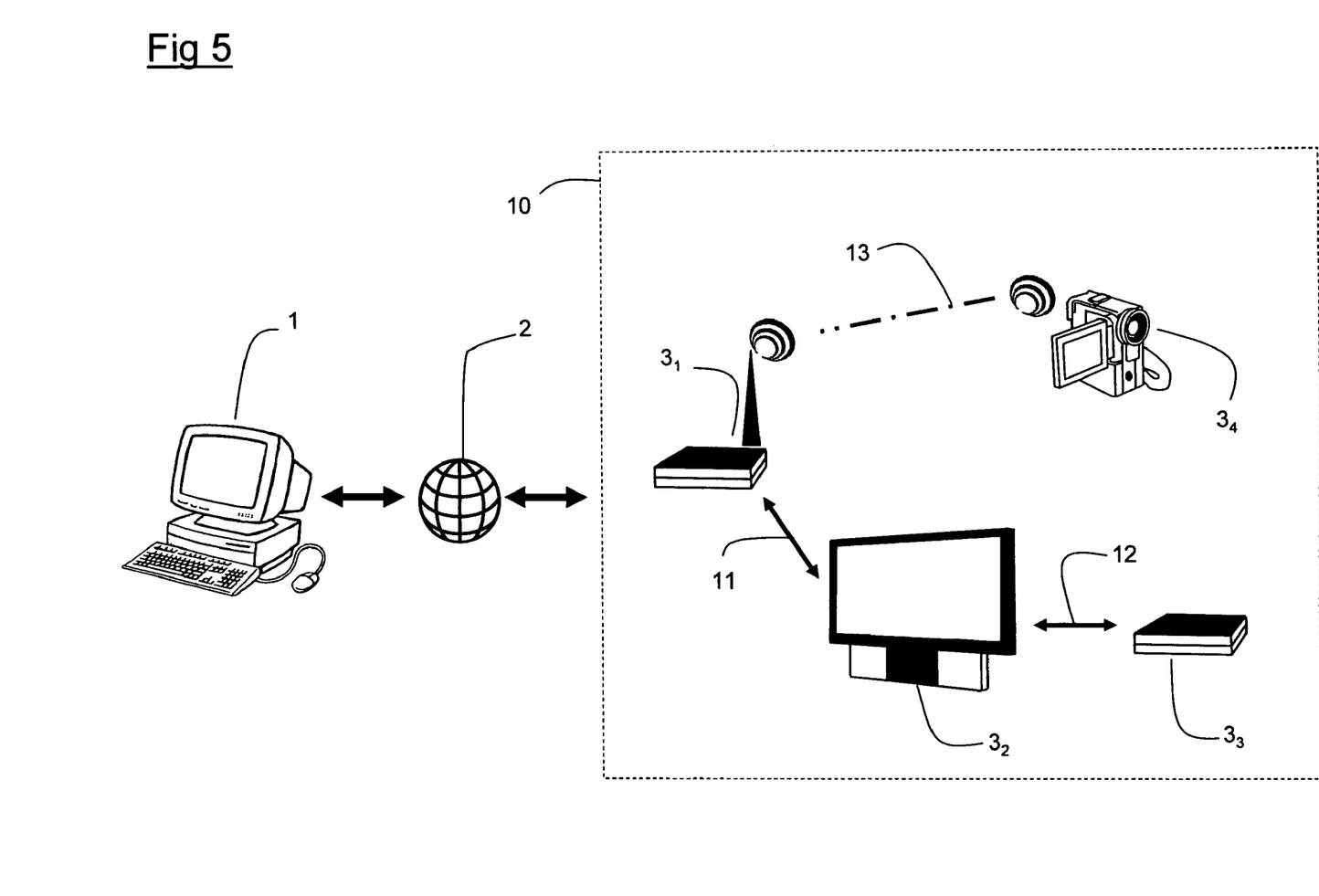
FIG. 5 shows the relationship between the remote testing device and devices to be tested in the case that the devices to be tested are interconnected within a respective home network according to the present invention.
Figure 6:
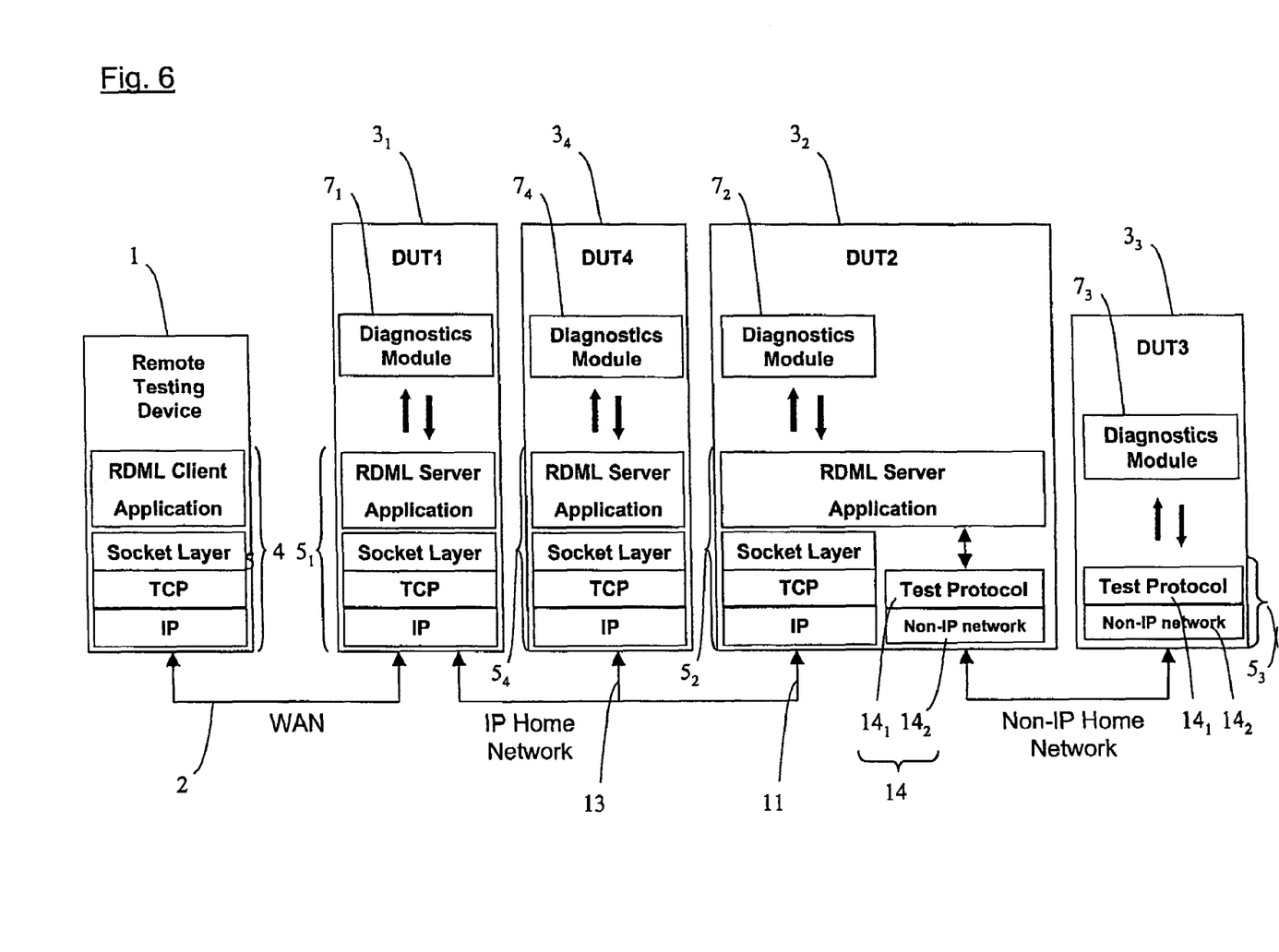
FIG. 6 shows respective protocol stacks of a preferred embodiment used when having a network structure as shown in FIG. 5 according to the present invention.

A preferred embodiment of respective protocol stacks used in the network test scenario of FIG. 5 is shown in FIG. 6. Each DUT $3_1$ to $3_4$ comprises its own diagnostics module (a first to fourth diagnose module $7_1$ to $7_4$) and its own protocol stack (a first to fourth protocol stack $5_1$ to $5_4$).

The first and the fourth DUT $3_1$, $3_4$ show the same construction as that of the DUT 3 described in conjunction with FIG. 2, and a further description within this respect will be omitted therefore.

As can be taken from FIG. 6, the second DUT $3_2$ comprises an additional protocol stack 14 comprising a test protocol layer $14_1$ and a non-IP network layer $14_2$. Accordingly, in the third DUT $3_3$, another additional protocol stack 15 is installed. The second DUT $3_2$ and the third DUT $3_3$ communicate with each other by respectively using said additional protocol stacks 14 and 15. The second DUT $3_2$ further comprises functionality for converting diagnostics informa-tion from/to XML scripts to/from the device-specific diagnose protocol. In other words, the first, second, and fourth DUT $3_1$, $3_2$, and $3_4$ are IP-enabled devices, each device having an RDML-server capable to receive and process RDML-scripts addressed to them coming from the remote testing device. The third DUT $3_3$ does not implement the IP protocol. For the third DUT $3_3$ to be reachable for remote-testing via RDML, the second DUT $3_3$ acts as a proxy for a legacy test protocol implemented by the third DUT $3_3$, for example, indicated by the additional protocol stacks 14 and 15.

The remote testing device 1 uses the RDML <networktopology> command tag to request an RDML server to return topology information. The server does this using the RDML <networktopology> response tag with appropriate contents. This step is done in addition to the first step S1, wherein the rest of the diagnost procedure for each DUT $3_1$ to $3_4$ is the same as that previously described in the context for a single DUT 3: The remote testing device 1 retrieves each different DUT's set of implemented tests preferably from a database and executes them on the respective DUT's $3_1$ to $3_4$.

The invention claimed is:

1. A method for diagnosing devices, which are connected in a user's network, via a remote testing device which is connectable to devices to be diagnosed via a communication network, comprising:

performing diagnosing by exchanging diagnostics information between said remote testing device and said devices to be tested via said communication network, wherein said diagnostics information is included within XML-scripts being exchanged between said remote testing device and said devices to be tested, wherein said XML-scripts constitute XML-language extensions;

requesting from the remote testing device a topology of said user's network with said diagnostics information;

transmitting said topology to said remote testing device within said diagnostics information; and transmitting a status change of the topology of said user's network within said diagnostics information to said remote testing device, in case that a device has been added to said user's network or removed from said user's network.

2. The method according to claim 1, further comprising:
transmitting a list of devices, which are connected in said user's network within said diagnostics information to said remote testing device.

3. The method according to claim 1, further comprising: transmitting said topology by representing said devices as nodes of a graph and connections between devices as edges between nodes.

4. The method according to claim 1, further comprising: transmitting a network technology, by which said devices are connected in said user's network within said diagnostics information to said remote testing device.

5. The method according to claim 1, further comprising: requesting the actual topology of said user's network by said remote testing device after receiving said status change and transmitting the actual topology to said remote testing device.

6. The method according to claim 5, further comprising: providing diagnosing means within the devices; and implementing self-tests into the diagnosing means for diagnosing the devices and executing said diagnostics self-tests based on said received diagnostics information.

7. A computer readable medium including computer executable instructions, wherein the instructions, when executed by a computer, cause the computer to perform the method according to claim 1.

8. A remote testing device being connectable to devices, which are connected in a user's network, to be diagnosed via a communication network, said remote-testing device comprising:
communication means for sending or receiving diagnostics information to or from said devices to be diagnosed,
wherein said communication means includes an XML-client-module having functionality to send or receive XML-scripts constituting XML-language extensions, said XML-scripts including said diagnostics information, and said diagnostics information includes a topology of said user's network requested by said remote testing device, and
said remote testing device is configured to receive said diagnostics information after a status change of the topology of said user's network has been received by said remote testing device, and said remote testing device is configured to request an actual topology of said user's network.

9. A remote testing device according to claim 8, wherein said remote testing device is configured to receive said diagnostics information including a transmitted topology of said user's network.

10. The remote testing device according to claim 8, further comprising:
diagnosing means for executing already implemented diagnostics self-tests based on said received diagnostics information.

11. A device being connectable to a remote testing device via a communication network, said device comprising:
communication means for sending or receiving diagnostics information to or from said remote testing device, wherein said communication means comprises an XML server-module having functionality to send or receive send XML-scripts constituting XML-language extensions, said XML-scripts including said diagnostics information; and
a server application configured to transmit a network topology of a user's network, which comprises said device and connected other devices to said remote testing device, within said diagnostics information,
wherein said server application is configured to transmit a status change of the topology of said user's network within said diagnostics information to said remote testing device, in case that a device has been added to said user's network or removed from said user's network.

12. The device according to claim 11, wherein said server application is configured to transmit a list of devices that are connected in said user's network to said remote testing device within said diagnostics information.

13. The device according to claim 11, wherein said server application is configured to transmit said topology by representing said devices as nodes of a graph and connections between devices as edges between nodes.

14. The device according to claim 11, wherein said server application is configured to transmit a network technology, by which said devices are connected in said user's network within said diagnostics information to said remote testing device.

15. The device according to claim 11, further comprising:
diagnosing means with implemented self-tests, which are executed based on said received diagnostics information.

16. A system for remotely diagnosing devices connected in a user's network via a communication network, comprising:
a remote testing device including,
first communication means for sending or receiving diagnostics information to or from said devices to be diagnosed,
wherein said first communication means includes an XML-client-module having functionality to send or receive XML-scripts constituting XML-language extensions, said XML-scripts including said diagnostics information, and said diagnostics information includes a topology of said user's network requested by said remote testing device, and
said remote testing device is configured to receive said diagnostics information after a status change of the topology of said user's network has been received by said remote testing device, and said remote testing device is configured to request an actual topology of said user's network; and
at least one device to be diagnosed including,
second communication means for sending or receiving diagnostics information to or from said remote testing device, wherein said second communication means comprises an XML server-module having functionality to send or receive XML-scripts constituting XML-language extensions, said XML-scripts including said diagnostics information; and
a server application configured to transmit the topology of the user's network, which comprises said device and connected other devices to said remote testing device, within said diagnostics information,
wherein said server application is configured to transmit the status change of the topology of said user's network within said diagnostics information to said remote testing device, in case that a device has been added to said user's network or removed from said user's network,
wherein said remote testing device and said at least one device to be diagnosed are respectively connected via said communication network.

* * * * *